Figure 1:
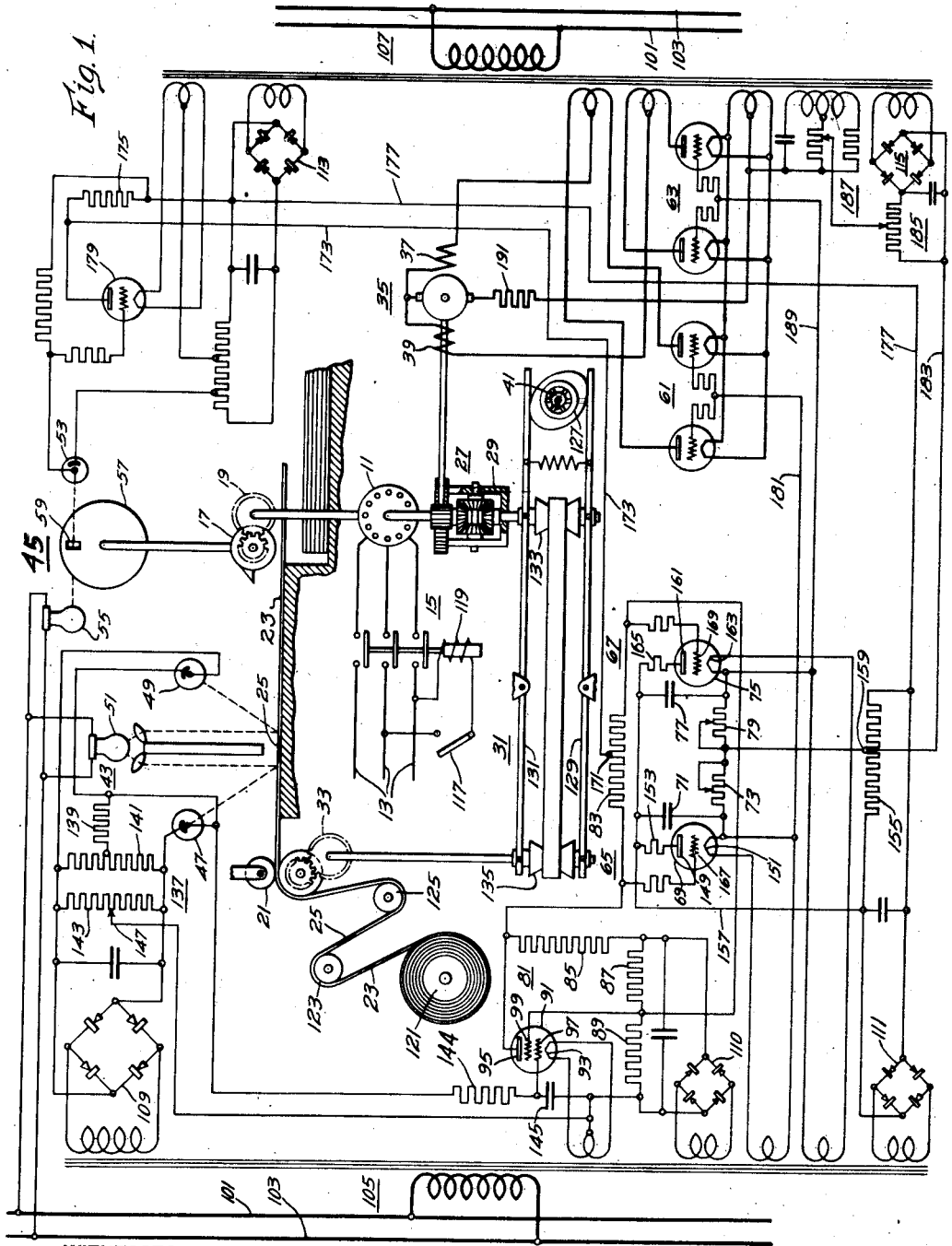

March 26, 1940.　　F. H. GULLIKSEN　　2,195,006
REGISTER REGULATOR CONTROL
Filed April 14, 1938　　2 Sheets-Sheet 1

WITNESSES:
C. J. Weller.
Leon J. Taza.

INVENTOR
Finn H. Gulliksen.
BY
Paul E. Friedemann
ATTORNEY

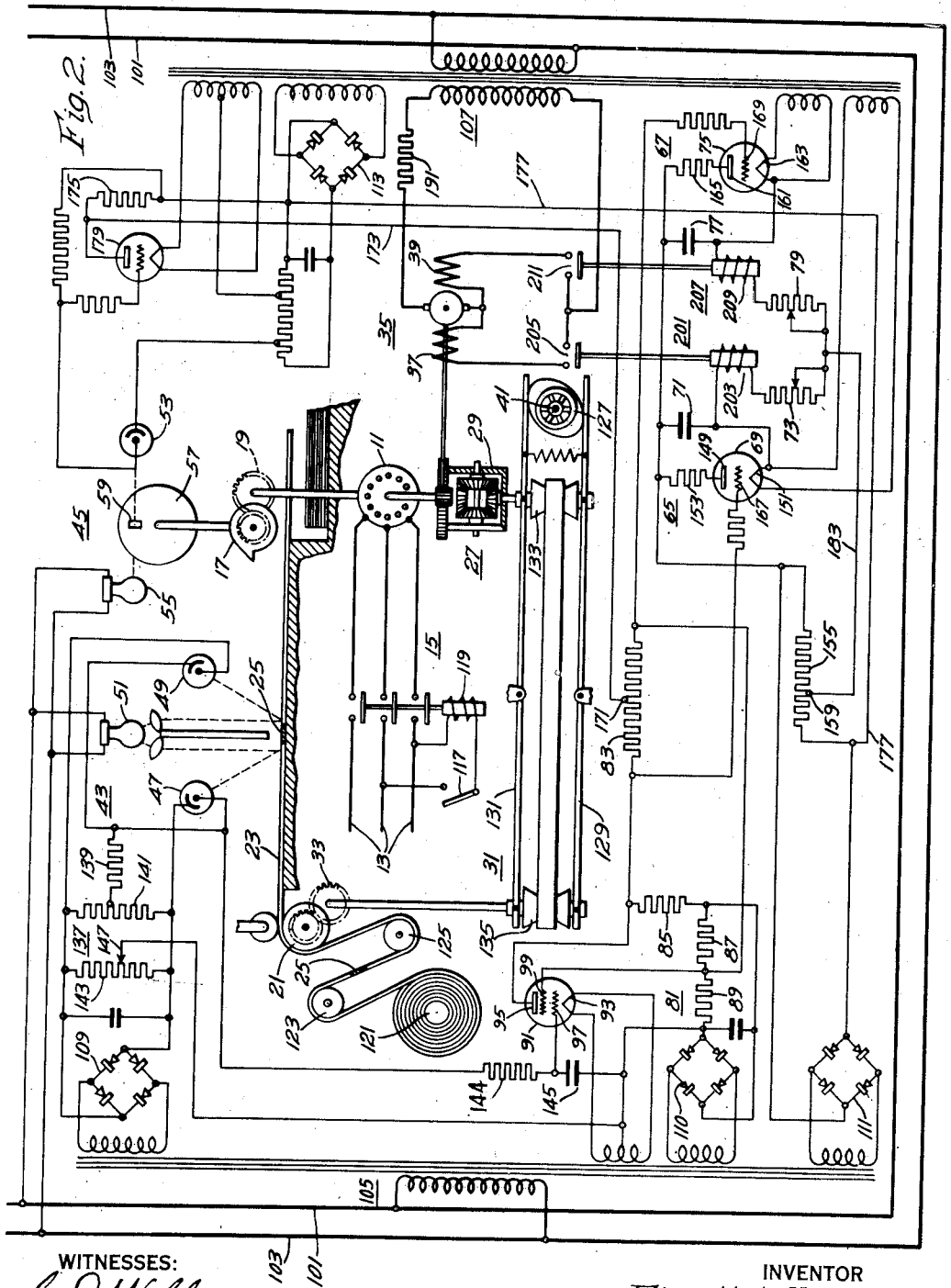

Patented Mar. 26, 1940

2,195,006

UNITED STATES PATENT OFFICE 2,195,006

REGISTER REGULATOR CONTROL

Finn H. Gulliksen, Wilkinsburg, Pa., assignor to Westinghouse Electric & Manufacturing Company, East Pittsburgh, Pa., a corporation of Pennsylvania Application April 14, 1938, Serial No. 201,950

16 Claims. (Cl. 164—68)

This invention relates to electrical control systems for apparatus operating on material.

More specifically, this invention relates to electrical control systems involving thermionic means and light-sensitive means for controlling the relative positions and relative speeds of certain parts of a machine operating on a web of material.

In the art of paper cutting, winding, printing, or other manufacturing processes, such as the making of bags, the operation of the paper or web of material, when moving from a supply reel past certain rolls to the cutter, or to other parts of the machine, nearly always involves slippage, whereby the paper becomes shifted relative to the cutter or other machine element. Even when there be no slippage, the hygroscopic characteristics of paper, or temperature, or both, will cause a change in its dimensions, and also its surface characteristics, with changes of relative humidity and/or changes in temperature, with the result that certain machine elements will not register with the paper in the desired manner. Slippage and the moisture effect may, of course, occur simultaneously.

One object of my invention is to provide for properly registering certain regions of a material being operated upon by a machine with certain elements of the machine.

It is another object of this invention to control the operation of apparatus operating on a web so that the required operation on the web will take place at the right point, regardless of slippage of the web, or changes of dimensions or the surface characteristics thereof.

It is also an object of my invention to provide means for correcting in one continuous operation each departure from registry of a material and certain elements of a machine operating on it.

Another object of this invention is to control the relative speeds of a cutter and the feeding means of a machine, operating on a web, by means of photo-electric control means.

A further object of this invention is to control the position of the web, in a machine operating on a web, by photo-electric control means.

It is also an object of my invention to provide electronic selective control means for controlling the direction of operation of a motor or other electrical device in response to variations in position of a mark on a material operated upon by a machine.

Another object of my invention is to provide electronic timing means for controlling the operation of a motor.

Another object of this invention is to control the relative speeds of certain parts of a machine operating on a web and the relative positions of these parts by the cooperative action of photo-electric and thermionic means.

A board object of my invention is to provide photo-electric control means, unaffected by changes in color of the material being operated upon by a machine or by changes in appearance or by changes in the character or the condition of the material, to control the machine so that certain elements of the machine are caused to register with the indicia which may be either on or in the material.

A still further broad object of my invention is to provide a compensating control system, including photo-electric means for compensating for changes in the color and depth of color of the web, shade of the web and the character, shade and color of the indicia which may be either on or in the web, to register certain elements of a machine operating on a web with selected regions of the web.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawings, in which:

Figure 1 is a diagrammatic representation of an electrical control system embodying my invention; and, Fig. 2 is a diagrammatic representation of a modification of my invention.

Referring more particularly to Figure 1 of the drawings, an electric motor 11, preferably an induction motor, is supplied with electrical energy from buses 13 through line contactor 15. A cutter 17 is coupled to the motor 11 through a reduction gear 19. The motor 11 is also utilized to drive a web feeding mechanism 21 which feeds a strip of web material 23 having indicia 25 thereon, to the cutter 17. The indicia 25 comprises spots or marks printed on or appearing in the web 23 and spaced at predetermined intervals. The operation of the web feeding mechanism 21 takes place through a mechanical differential or localizer 27 having a housing 29, a speed changer 31 and reduction gearing 33. The localizer 27 may be adjusted by motor means such as a motor 35 having a pair of differentially wound field windings 37 and 39. The speed controller 31 may be adjusted by hand wheel 41. It will readily be understood that a motor may be utilized to adjust the speed controller 31 and a hand wheel may be utilized to adjust the localizer 27.

Associated with the apparatus for operating on the web 23 are light-sensitive or radiation responsive scanners 43 and 45. The light-sensitive means or photo-electric scanner 43 comprises a pair of photo-electric devices 47 and 49 and a light source 51 disposed to be mounted for scanning the web material 23 and the indicia 25. The scanner means 45 comprises a photo-electric device 53 actuated by the cooperative action of a light source 55 and a disc 57. The disc, having a hole or slot 59, is disposed to be coupled to and actuated by the cutter 17.

The direction of operation of the motor 35 is controlled by two pairs of electric discharge devices 61 and 63 which are in turn controlled by the electronic timing means 65 and 67, respectively. The timing means 65 comprises an electric discharge device 69, a capacitor 71 and an adjustable resistor 73. Similarly the timing means 67 comprises an electric discharge device 75, a capacitor 77 and an adjustable resistor 79. The electric discharge devices 69 and 75 are controlled by the cooperative action of the scanner means 43 and 45 and a selective control means 81. The selective control means 81 which may be a balanced bridge network, comprises resistors 83, 85, 87 and 89 and an electric discharge device 91, preferably of the high vacuum type, having a cathode 93, an anode 95 and a control electrode 97. An additional control electrode 99 may be utilized, as shown, to obtain a higher amplification factor for the discharge device. The electric discharge device 91 is controlled by the scanner means 43.

The operation of the system, generally stated, embodies the synchronizing of the indicia 25 on the web 23 with the slot 59 in the disc 57 which rotates with the cutter 17. This synchronization thus provides that the cutter will cut the web of material each time when the indicium or spot 25 with reference to which a given cut is to be made has a definite relation with reference to the cutter 17. When the movement of the spots 25 is synchronized with reference to the cutter, the photo-electric device 47, or 49, as the case may be, does not function simultaneously or substantially simultaneously with the photoelectric device 53. If, however, the movement of the spots 25 is not in proper relation with reference to the cutter 17, the impulse given either by the photo-electric device 47, or 49, occurs substantially simultaneously with the impulse given by the photo-electric device 53 thereby causing the operation of the timing means 65, or 67, which controls the operation of the pairs of discharge devices 61 or 63, respectively, and thus the direction of rotation of motor 35.

Operation of the motor 35 causes a shift in the relative position of the cutter 17 and the web feeding mechanism 21 in one direction or the other, and operation of the hand wheel causes a selected change in the speed difference between the cutter 17 and the web feeding mechanisms 21. As broadly hereinbefore indicated, when motor 35 is caused to operate the change in speed relation between the cutter and the web feeding mechanism is to make the correction necessary to synchronize the spot on the web and the knife of the cutter. The operation of motor 35 operating on housing 29 of the differential mechanism 27 causes a shift in the position between the cutter 17 and the web feeding mechanism 21 in such a direction as to correct for the amount of asynchronous operation between the cutter blade and the spot on or in the web. The timing means 65 and 67 may be so adjusted that the motor 35 will continue to operate until the correction necessary shall have been completed and no further synchronizing operation is necessary.

An important factor in any cutter control application is the mechanical arrangement of the feeding roll, speed changing device, and the localizer equipment. In some cutting applications the slip of the paper is relatively small, in others substantially zero, and in still others practically constant, so that when the speed ratio between the cutter and the feed roll is properly adjusted by the hand wheel 41, the entire control can thereafter be obtained by means of the automatic adjustment of the localizer or differential mechanism 27.

A better understanding of the invention may be had from a study of the sequence of operation involving a typical synchronizing operation for the embodiment of my invention. In Fig. 1, reference characters 101 and 103 represent a pair of conductors or bus bars. If the bus bars 101 and 103 are assumed to be suitably energized, a number of energized circuits are thereby established because transformers 105 and 107 are energized with the result that full-wave rectifiers 109, 110, 111, 113 and 115 are energized to provide the necessary direct current potential for the timing means, bridge networks, as well as the desirable bias for the control electrodes or grids of the respective electric discharge devices constituting part of my system of control.

Ordinarily the photo-electric devices 47 and 49 of the photo-electric scanner 43 are positioned relative to each other so that they do not scan the same region at the same time. The preferable positioning is such that the scanning takes place near the margin of the material in the line of movement of the material so that each spot 25 is not scanned simultaneously but successively by the photo-electric devices 47 and 49.

For a complete cycle operation of my system of control it must be assumed that the switch 117 has been closed to energize the actuating coil 119 of the line contactor 15, thereby energizing the motor 11 from the conductors 13. Operation of the motor 11 drives the cutter 17 and the disc 57 through the reduction gear 19. This motor also drives the web feeding mechanism through the differential or localizer 27, the speed changing device 31, and the reduction gearing 33. The material is thus fed from a supply reel 121 and passes over the idling and tension-adjusting rollers 123 and 125 to the feeding mechanism 21. As will be observed, any movement of a cam 127 will operate the spring biased levers 129 and 131 in such a direction that the cone-shaped two-part pulleys 133 and 135 will change the speed of the feeding mechanism 21 relative to the speed of the cutter 17. The cam 127 is provided with the hand wheel 41 for manually adjusting the relative speed of the feeding mechanism 21 and the cutter 17.

As long as the housing 29 remains fixed, the relative position of certain parts of the cutter and the feeding mechanism remains fixed, and during operation, the relative speeds of the cutter and the feeding mechanism remain constant.

Specific dimensions, or a given nature of the indicia 25 are not material to my invention. It is sufficient that some indicia be placed on the web or in the web at the points it is desired to have the web material cut or at some predetermined position with reference to the desired cut, so that the amount of light transmitted from the source of light to the photo-electric device is periodically modified. It will, therefore, be understood that the color differential between the indicia and the web may be such that the indicia, when entering or leaving the region being scanned, will either cause an increase or a decrease in the current passing through the respective photo-electric devices.

If the apparatus is in normal operation, and the adjustment of the web with reference to the cutter, as well as the speed of the cutter 17 with reference to the web feeding device 21 has been properly effected, each spot 25 will arrive at a central position relative to the photo-electric devices 47 and 49 when the slot 59 in the disc 57 reaches such a position relative to the light source 55 that the photo-electric device 53 becomes activated, as long as the feeding mechanism and the cutter remain in synchronism. At these instances one spot will thus be between the regions scanned by the photo-electric devices 47 and 49 and it may be either entirely outside of the region scanned or each end of the spot 25 may extend into a portion of the respective regions scanned in such a manner that the photo-electric devices 47 and 49 will be substantially equally affected.

The photo-electric devices 47 and 49 are connected in a bridge network 137 comprising resistors 139, 141 and 143 and energized by the rectifier 109. The bridge network 137 is connected between the control electrode 97 and the cathode 93 of the discharge device 91 through a conventional grid resistor 144. A capacitor 145 is also connected between the control electrode 97 and the cathode 93 to by-pass alternating current ripples caused by line voltage surges and static pick-up in the control electrode circuit leads. The potential between the control electrode 97 and the cathode 93 is adjusted by moving an adjustable conductor 147 on resistor 143 until the current through the discharge device 91 is at an intermediate value and the voltage across the resistor 83 is zero or substantially zero when illumination from the light source 51 of substantially equal intensity is reflected from the web onto the photo-electric devices 47 and 49. As hereinabove stated the discharge device 91 is part of the bridge network 81 which is energized by the rectifier 110. When variations in the illumination or the color, finish and other characteristics of the web material affect both photo-electric devices 47 and 49 equally, the current through the discharge device 91 and thus voltage across the resistor 83 remains unchanged. When the illumination on one of the photo-electric devices 47 or 49 is modified relative to that of the other the current through the discharge device 91 is changed and a voltage is established across the resistor 83. The polarity of this voltage depends upon whether the current through the discharge device 91 has been increased above or decreased below the intermediate value.

The capacitor 71 is connected between anode 149 and cathode 151 of the discharge device 69 through a resistor 153, thus establishing a discharge circuit for the capacitor 71 which extends from one side of the capacitor through the resistor 153, anode 149, cathode 151 and to the other side of the capacitor 71. The capacitor 71 is charged by means of a circuit which extends from end of resistor 155, which is energized by the rectifier 111, through conductor 157, capacitor 71, adjustable resistor 73 to a selected tap 159 on the resistor 155.

Similarly the capacitor 77 is connected between anode 161 and cathode 163 of the discharge device 75 through a resistor 165. The capacitor 77 is charged by means of a circuit which extends from one end of the resistor 155 through the conductor 157, capacitor 77, adjustable resistor 79, the tap 159 and resistor 155.

One end of the resistor 83 of the bridge network 81 is connected to a control electrode 167 of the discharge device 69. The other end is connected to a control electrode 169 of the discharge device 75. A mid-tap 171 on resistor 83 is connected by means of conductor 173 to one end of a resistor 175. The other end of resistor 175 is connected by means of conductor 177 to the resistor 155. A circuit for supplying a plurality of potentials between the control electrode 167 and the cathode 151 of the discharge device 69 thus extends from the control electrode 167 through resistor 83, mid-tap 171, conductor 173, resistor 175, conductor 177, resistor 155, tap 159, adjustable resistor 73 to the cathode 151. Similarly the control circuit for the discharge device 75 extends from the control electrode 169 through the resistor 83, mid-tap 171, conductor 173, resistor 175, conductor 177, resistor 155, tap 159, adjustable resistor 79 to the cathode 163.

The resistor 175 is energized from the rectifier 113 through an electric discharge device 179 which is controlled by the light sensitive means 45. When the disc 57 intercepts the light beam from the light source 55 to the photo-electric device 53, the discharge device 179 and thus the resistor 175 are energized. When the disc 57 is in such a position that the photo-electric device 53 becomes actuated by the light beam passing through the slot 59, the discharge device 179 and thus the resistor 175 becomes deenergized.

Each pair of electric discharge devices 61 and 63 is connected in a well known manner to obtain full-wave rectification. To control the operation of the pair of discharge devices 61 a circuit extends from the control electrodes of the pair of devices 61 through conductor 181, adjustable resistor 73, tap 159, conductor 183, an adjustable source of negative bias 185, an adjustable source of dephased potential 187 to the cathodes of the discharge devices 61. To control the operation of the pair of discharge devices 63 a circuit extends from the control electrodes of the pair of devices 63 through conductor 189, adjustable resistor 79, tap 159, conductor 183, an adjustable source of negative bias 185, an adjustable source of dephased potential 187 to the cathodes of the discharge devices 63.

As the material 23 advances from the feeding device 21 to the cutter 17, the spot 25 first modifies the illumination on the photo-electric device 47, causing the potential of the control electrode 97 relative to the cathode 93 to become more negative and thus decreasing the current through the discharge device 91 below the intermediate value. The bridge network becomes unbalanced in such a manner that the right hand end of the resistor 83 becomes negative with respect to the left hand end. Assuming that the spot 25 is in synchronism with the cutter 17, the disc 57 will intercept the light beam from the source 55 and, therefore, resistor 175 will be energized. Because resistors 155 and 175 are energized the control electrode 167 does not become sufficiently positive with respect to the cathode 151 to energized discharge device 69. At this time the control electrode 169 of discharge device 75 becomes still more negative with respect to the cathode 163.

Still assuming that the apparatus is in synchronism, the spot 25 will advance until it is no longer scaned by photo-electric device 47. Then slot 59 in disc 57 reaches such a position that photo-electric device 53 becomes actuated, thus deenergizing the discharge device 179 and, therefore, the resistor 175 becomes deenergized. Both control electrodes 167 and 169 become more positive but because resistor 83 is now deenergized and resistor 155 is energized, the control electrodes 167 and 169 are not sufficiently positive to energize the discharge devices 69 and 75.

The spot advances until it causes photo-electric device 49 to function. During synchronism the photo-electric device 53 will again be dark and resistor 175 energized at this time. The current through the discharge device 91 will thus increase above the intermediate value causing the bridge network 81 to become unbalanced in such a manner that the right hand end of the resistor 83 becomes positive with respect to the left hand end. The control electrode 169 will become more positive, but because of the energized resistor 155 and 175, it will not be sufficiently positive to energize the discharge device 75. At this time the control electrode 167 of discharge device 69 becomes still more negative.

If the apparatus is out of synchronism and the cutter cuts the material too soon or leads, the spot 25 causes the photo-electric device 47, and the slot 59 causes the photo-electric device 53 to function so that the resistor 175 is deenergized. Thus the control electrode 167 momentarily becomes sufficiently more positive and the discharge device 69 is energized. The capacitor 71 discharges immediately and thus decreases the anode to cathode potential so that the discharge device 69 becomes deenergized. The capacitor 71 is then charged through adjustable resistor 73 as hereinbefore explained. The potential drop across the adjustable resistor 73 due to the charging current thus causes the pair of discharge devices 61 to become energized. The field winding 37 and the armature of motor 35 are then energized and the motor is operated in such a direction that the speed of the web material 23 is increased. The motor 35 continues to operate while the capacitor 71 is being charged.

The time interval between spots 25, that is the time required for a spot to travel a distance equal to the distance between two succeeding spots, is very short. By adjusting the resistor 73, the time required for charging the capacitor 71 can be made longer than the time interval between spots. As long as the web is out of synchronism with the cutter, the next succeeding spot will cause the capacitor 71 to be discharged while there is still sufficient charging current passing through resistor 73 to maintain the discharge devices 61 in the energized condition. Thus the motor 35 continues to operate until the cutter 35 operates on the web 23 at the proper time.

For intermittent operation of the motor 35 while the indicia 25 is out of synchronism, the resistor 73 may be adjusted so that the time interval between spots is longer than the time required for charging the capacitor 71. It will readily be understood that the interval between spots need not be equal to the time required for the disc 57 and thus the slot 59 to rotate one revolution. It is sufficient that spots be spaced so that the time interval required for suitable operation be some multiple of the time required for one revolution of the disc 57 or cutter 17.

It will be clear from the above described operation that had the cutter 17 cut the material too late or lagged, the spot 25 would have caused the photo-electric device 49 to function substantially simultaneously with the actuation of photo-electric device 53. Thus the discharge device 75 would be energized, which in turn would cause the energization of the pair of discharge devices 63 and the field winding 39. The motor 35 would rotate in the reverse direction, that is, in such a direction as to cause the speed of the web to decrease. The motor 35 would continue to operate until the web is again in synchronism. Since these operations are similar to those hereinabove described, it is believed unnecessary to the understanding of the invention to repeat a description of these operations.

Should both pairs of discharge devices 61 and 63 become energized at the same time, a resistor 191 is provided to protect the motor 35 from excessive currents.

In the modification shown in Fig. 2, corresponding elements have been given the same reference characters and only such elements as are not found in Fig. 1 are referred to by different reference characters. The system in Fig. 2 differs primarily from that shown in Fig. 1 in that an electromagnetic device 201 having an operating coil 203 and a set of contacts 205 is utilized in place of the pair of discharge devices 61 and an electromagnetic switch 207 having an operating coil 209 and a set of contacts 211 is utilized in place of the pair of discharge devices 63 for controlling the operation of motor 35. The operating coil 203 is connected in the circuit for charging the capacitor 71, one end of the operating coil is connected to the adjustable resistor 73 and the other end is connected to the junction between the capacitor 71 and the cathode 151. Similarly, the operating coil 209 is connected between the adjustable resistor 79 and the capacitor 77. The contacts 205 and 211 are connected in the circuit of field winding 37 and 39 respectively.

The operation of the system in Fig. 2 is similar to that hereinabove described with reference to Fig. 1 except that after the discharge device 69 has functioned the current for recharging the capacitor 71 also energizes the operating coil 203. The electro-magnetic device 201 is actuated to close contacts 205, thus energizing the field winding 37 and the armature of motor 35. The motor may continue to operate, depending upon the adjustment of resistor 73, until the web material 23 is again in synchronism with the cutter 17.

Similarly, after the discharge device 75 has functioned, the current for recharging the capacitor 77 also energizes the operating coil 209. The electromagnetic device 207 is actuated to close contacts 211, thus energizing the field winding 39 and the armature of motor 35. The motor 35 then operates to again bring the web in synchronism with the cutter 17.

In the control systems hereinabove described with reference to Figs. 1 and 2, both photoelectric devices 47 and 49 scan the indicia 25. While one photo-electric device 47 or 49 scans the spot 25, the other continues to act as a compensating device by scanning the web 23. However, it will readily be understood that only one of the photo-electric devices 47 and 49 need be used for scanning the indicia 25 while the other continuously scans the web 23. For example, the photo-electric device 47 is so positioned that it scans the indicia 25 and the web 23 while the photo-electric device 49 scans the web in a region that, relatively speaking, moves parallel to the indicia 25.

The arm 147 is so adjusted on resistor 143 that the discharge device 91 conducts an intermediate value of current sufficient to balance the currents in the bridge network 81 so that the voltage across resistor 83 is zero when the photo-electric device 47 scans a certain predetermined portion of the spot 25. When the photo-electric device 47 scans a larger portion of the spot 25, the discharge device conducts a current larger than the intermediate value, thus causing the right hand end of resistor 83 to become more positive than the left hand end. When the photo-electric device 47 scans a smaller portion of the spot 25 the discharge device 91 conducts a current smaller than the intermediate value, thus causing the right hand end of resistor 83 to become more negative than the left hand end.

I do not wish to be restricted to the specific structural details, arrangement of parts or circuit connections herein set forth, as various other modifications thereof may be effected without departing from the spirit and scope of my invention. I desire, therefore, that only such limitations shall be imposed as are indicated in the appended claims.

I claim as my invention:

1. In a web controller, in combination, a cutter, a web-feeding mechanism for advancing web material carrying indicia at specified points longitudinally thereof, speed adjusting means mechanically connected between the said cutter and the said web-feeding means, a motor for operating the said speed adjusting means, a pair of photo-electric devices cooperatively associated with the web and the indicia, the said photo-electric devices being interconnected in a balanced network, selective control means including a discharge device responsive to the differential effect of the said photo-electric devices, light-sensitive means cooperatively associated with the cutter, and electronic timing means controlled by the cooperative action of the said selective control means and the said light-sensitive means for controlling the operation of the said motor to adjust the speed of the said cutter relative to the said web-feeding mechanism.

2. Apparatus for maintaining the relative position of a strip of material fed to a machine having an element operating on the strip comprising, in combination, means for effecting a change in the relative positions of the strip and the said element, a motor connected to actuate the means for effecting a change in the relative positions of the strip and the said element, a pair of photo-electric devices interconnected in a balanced network and cooperatively associated with the strip, selective control means including a discharge device responsive to the differential effect of the said photo-electric devices, light-sensitive means cooperatively associated with the said element, electronic timing means controlled by the cooperative action of the said selective control means and the said light-sensitive means for selectively controlling the operation of the said motor whereby after a departure of the strip of material from a predetermined relation with reference to the said element the strip of material is repositioned in proper relation to the element in one continuous operation of the motor.

3. Apparatus for maintaining the relative position of a strip of material fed to a machine having an element operating on the strip comprising, in combination, means for effecting a change in the relative positions of the strip and the said element, a motor connected to actuate the means for effecting a change in the relative positions of the strip and the said element, a pair of photo-electric devices interconnected in a balanced network and cooperatively associated with the strip, selective control means including a discharge device responsive to the differential effect of the said photo-electric devices, electrical timing means controlled by the said selective control means for selectively controlling the operation of the said motor after a departure of the strip of material from a predetermined relation with reference to the said element to reposition the strip of material in proper relation to the element in one continuous operation of the motor.

4. Apparatus for maintaining the relative position of a strip of material fed to a machine having an element operating on the strip comprising, in combination, means for effecting a change in the relative positions of the strip and the said element, a motor connected to actuate the means for effecting a change in relative positions of the strip and the said element, a first light sensitive means cooperatively associated with the said strip, a second light sensitive means directly cooperatively associated with the said element, and means controlled by said first and second light-sensitive means for selectively controlling the said motor after a departure of the strip of material from a predetermined relation with reference to the said element.

5. Apparatus for maintaining the relative position of a strip of material fed to a machine having an element operating on the strip comprising, in combination, means for effecting a change in the relative speed of the strip and the said element, a motor connected to actuate the means for effecting a change in relative speed of the strip and the said element, a first light sensitive means cooperatively associated with the said strip, a second light sensitive means directly cooperatively associated with the said element, and means controlled by said first and second light-sensitive means for selectively controlling the said motor whereby after a departure of the strip of material from a predetermined relation with reference to the said element the speed of the said strip relative to the said element is adjusted to reposition the strip in proper relation to the element in one continuous operation of the motor.

6. Apparatus for maintaining the relative position of a strip of material fed to a machine having an element operating on the strip comprising, in combination, means for effecting a change in the relative positions of the strip and the said element, a motor connected to actuate the means for effecting a change in relative positions of the strip and the said element, a first light sensitive means cooperatively associated with the said strip, a second light sensitive means directly cooperatively associated with the said element, and means simultaneously controlled by said first and second light-sensitive means for selectively controlling the said motor after a departure of the strip of material from a predetermined relation with reference to the said element.

7. Apparatus for maintaining the relative position of a strip of material fed to a machine having an element operating on the strip comprising, in combination, means for effecting a change in the relative speed of the strip and the said element, a motor connected to actuate the means for effecting a change in relative speed of the strip and the said element, a first light sensitive means cooperatively associated with the said strip, a second light sensitive means directly cooperatively associated with the said element, and means simultaneously controlled by said first and second light-sensitive means for selectively controlling the said motor whereby after a departure of the strip of material from a predetermined relation with reference to the said element the speed of the said strip relative to the said element is adjusted to reposition the strip in proper relation to the element in one continuous operation of the motor.

8. In a web controller, in combination, a cutter, a web feeding mechanism for advancing web material carrying indicia at specified points longitudinally thereof, position adjusting means mechanically connected between the said cutter and the said web-feeding means, a pair of photoelectric devices cooperatively associated with the web and the indicia, the said photo-electric devices being interconnected in a balanced network, selective control means including a discharge device responsive to the differential effect of the said photo-electric devices, light-sensitive means cooperatively associated with the cutter, and electronic timing means controlled by the cooperative action of the said selective control means and the said light-sensitive means for controlling the operation of the said position adjusting means to adjust the position of certain parts of the said cutter relative to certain parts of the said web-feeding mechanism.

9. In a web controller, in combination, a cutter, a web-feeding mechanism for advancing web material carrying indicia at specified points longitudinally thereof, position adjusting means mechanically connected between the said cutter and the said web-feeding means, a motor for operating the said speed adjusting means, a pair of photo-electric devices cooperatively associated with the web and the indicia, the said photo-electric devices being interconnected in a balanced network, selective control means including a discharge device responsive to the differential effect of the said photo-electric devices, light-sensitive means cooperatively associated with the cutter, and means controlled by the cooperative action of the said selective control means and the said light-sensitive means for controlling the operation of the said motor to adjust the speed of the said cutter relative to the said web-feeding mechanism.

10. Apparatus for maintaining the relative position of a strip of material fed to a machine having an element operating on the strip comprising, in combination, means for effecting a change in the relative positions of the strip and the said element, a pair of photo-electric devices interconnected in a balanced network and cooperatively associated with the strip, selective control means including a discharge device responsive to the differential effect of the said photo-electric devices, timing means controlled by the said selective control means for selectively controlling the operation of the said means for effecting a change in the relative positions of the strip and the said element after a departure of the strip of material from a predetermined relation with reference to the said element to reposition the strip of material in proper relation to the element in one continuous operation.

11. Apparatus for maintaining the relative position of a strip of material fed to a machine having an element operating on the strip comprising, in combination, means for effecting a change in the relative speeds, a pair of photo-electric devices interconnected in a balanced network and cooperatively associated with the strip, selective control means responsive to the differential effect of the said photo-electric devices, for selectively controlling the operation of the said means for effecting a change in the relative speeds of the strip and the said element after a departure of the strip of material from a predetermined relation with reference to the said element to reposition the strip of material in proper relation to the element.

12. Apparatus for maintaining the relative position of a strip of material fed to a machine having an element operating on the strip comprising, in combination, means for effecting a change in the relative positions of the strip and the said element, a motor connected to actuate the means for effecting a change in relative positions of the strip and the said element, a first light sensitive means, comprising a first and a second light sensitive device, cooperatively associated with the said strip, a second light sensitive means, comprising a single third light sensitive device, directly cooperatively associated with the said element, and means controlled by said first and second light-sensitive means for selectively controlling the said motor after a departure of the strip of material from a predetermined relation with reference to the said element.

13. Apparatus for maintaining the relative position of a strip of material fed to a machine having an element operating on the strip comprising, in combination, means for effecting a change in the relative positions of the strip and the said element, a motor connected to actuate the means for effecting a change in relative positions of the strip and the said element, a first, and a second light sensitive means cooperatively associated with the said strip, a third light sensitive means directly cooperatively associated with the said element, and means controlled by said first, second, and third light-sensitive means for selectively controlling the said motor after a departure of the strip of material from a predetermined relation with reference to the said element.

14. Apparatus for maintaining the relative position of a strip of material fed to a machine having an element operating on the strip comprising, in combination, means for effecting a change in the relative speed of the strip and the said element, a motor connected to actuate the means for effecting a change in relative speed of the strip and the said element, a first light sensitive means, comprising a first and a second light sensitive device, cooperatively associated with the said strip, a second light-sensitive means, comprising a single third light-sensitive device, directly cooperatively associated with the said element, and means controlled by said first and second light-sensitive means for selectively controlling the said motor whereby after a departure of the strip of material from a predetermined relation with reference to the said element the speed of the said strip relative to the said element is adjusted to reposition the strip in proper relation to the element in one continuous operation of the motor.

15. Apparatus for maintaining the relative position of a strip of material fed to a machine having an element operating on the strip comprising, in combination, means for effecting a change in the relative positions of the strip and the said element, a motor connected to actuate the means for effecting a change in relative positions of the strip and the said element, a first light-sensitive means, comprising a first and a second light sensitive device, cooperatively associated with the said strip, a second light-sensitive means, comprising a single third light sensitive device, directly cooperatively associated with the said element, and means simultaneously controlled by said first and second light-sensitive means for selectively controlling the said motor after a departure of the strip of material from a predetermined relation with reference to the said element.

16. Apparatus for maintaining the relative position of a strip of material fed to a machine having an element operating on the strip comprising, in combination, means for effecting a change in the relative speed of the strip and the said element, a motor connected to actuate the means for effecting a change in relative speed of the strip and the said element, a first light sensitive means, comprising a first and a second light sensitive device, cooperatively associated with the said strip, a second light sensitive means, comprising a third light sensitive device, directly cooperatively associated with the said element, and means simultaneously controlled by said first and second light-sensitive means for selectively controlling the said motor whereby after a departure of the strip of material from a predetermined relation with reference to the said element the speed of the said strip relative to the said element is adjusted to re-position the strip in proper relation to the element in one continuous operation of the motor.

FINN H. GULLIKSEN.